April 17, 1962     E. C. ARMENTROUT     3,029,610

REFRIGERATING APPARATUS INCLUDING DEFROSTING MEANS

Filed July 25, 1960     5 Sheets-Sheet 1

INVENTOR.
Everett C. Armentrout
BY
His Attorney

INVENTOR.
Everett C. Armentrout
BY
His Attorney

INVENTOR.
Everett C. Armentrout
BY
His Attorney

April 17, 1962 E. C. ARMENTROUT 3,029,610
REFRIGERATING APPARATUS INCLUDING DEFROSTING MEANS
Filed July 25, 1960 5 Sheets-Sheet 4

INVENTOR.
Everett C. Armentrout
BY
His Attorney

INVENTOR.
Everett C. Armentrout

United States Patent Office 3,029,610
Patented Apr. 17, 1962

3,029,610
REFRIGERATING APPARATUS INCLUDING DEFROSTING MEANS
Everett C. Armentrout, New Carlisle, Ohio, assignor to General Motors Corporation, Detroit, Mich., a corporation of Delaware
Filed July 25, 1960, Ser. No. 45,178
9 Claims. (Cl. 62—156)

This invention pertains to refrigerating apparatus and more particularly to means for defrosting refrigerator evaporators.

Hundreds of different arrangements have been devised for defrosting refrigerant evaporators. There is no agreement on which is the best. Clock-controlled defrosters have been most popular. However, they are subject to mechanical breakage, wear and contact difficulties. The clock mechanism becomes noisy before the refrigerator becomes obsolescent.

It is an object of this invention to provide a simple, inexpensive, quiet, reliable system without a gear train for periodically defrosting a refrigerant evaporator.

It is another object of this invention to provide an improved defrosting system in which a predetermined change in the state of a material periodically initiates a defrosting period together with improved means for restoring the system at the end of the defrosting cycle.

It is another object of this invention to provide a defrosting system in which the complete congealing of a liquid initiates a defrosting period and also the energization of an electric heater in heat transfer with the congealed liquid to liquefy the congealed liquid for the starting of a new refrigerating cycle.

These and other objects are attained in the forms shown in the drawings in which a household refrigerator having an upper, below freezing compartment is provided with an evaporator beneath its false bottom wall and a lower, above freezing compartment is provided with a second evaporator behind a false rear wall. Separate fans circulate the air between each of these compartments and the compartment behind the false walls containing the evaporators. With such an arrangement, the frost only accumulates on the evaporators and does not accumulate in either of the compartments. The evaporator adjacent the above freezing compartment ordinarily defrosts every refrigeration cycle. However, the frost accumulates on the below freezing evaporator.

According to my invention, in the wall between the two compartments, there is provided a closed glass receptacle containing a small amount of water. The upper face of this receptacle is in contact with the bottom of the drain pan. A small heater continuously heats the bottom of the receptacle so as to slowly cause the water in the receptacle to accumulate and congeal on its upper face by the freezing action of the low temperature of the bottom of the drain pan. When all of this water has frozen upon the upper face of the receptacle, the bottom of the receptacle rises in temperature and actuates a bimetal switch which energizes either through a bimetal relay circuit or directly a bimetal timing relay which stops the energization of the compressor motor and the freeze fan motor and energizes a defrost heater associated with the below freezing compartment temperature. Also energized at this time is a small heater on the upper face of the receptacle to melt the frozen water and a second small heater associated with the bottom of the receptacle so as to hold this bottom receptacle switch closed until the below freezing evaporator has been defrosted.

The temperature rise accompanying the defrosting of the evaporator opens a bimetal switch thereon to deenergize the holding heater at the bottom of the closed receptacle to cause the timing relay to stop the energization of the defrost heater and restore the energization of the motor-compressor unit and the below freezing compartment fan. To guard against prolonged heating of the defrost heater, there is provided a safety switch in direct heat transfer relation with the drain pan so that, upon an abnormal rise in temperature of the drain pan, the system will be restored to normal refrigeration operation. The safety switch is arranged so that it must be manually operated before any further automatic defrosting takes place.

Further objects and advantages of the present invention will be apparent from the following description, reference being had to the accompanying drawings wherein preferred embodiments of the present invention are clearly shown.

Figure 5:
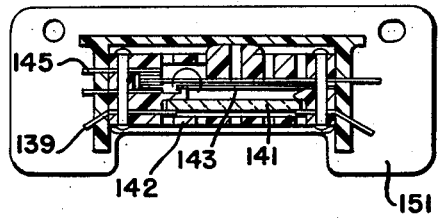
FIGURE 5 is a sectional view through a bimetal timing relay located adjacent the vegetable container in FIGURE 1.
Figure 6:
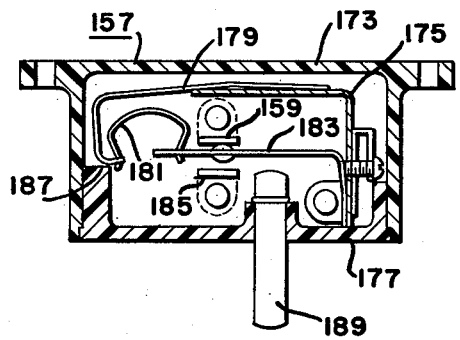
FIGURE 6 is a vertical sectional view through a safety switch associated with and located beneath the drain pan of the below freezing evaporator.

Referring now to the drawings, there is shown an insulated refrigerator cabinet 20 having an upper, below freezing compartment 22 and a lower, above freezing compartment 24, each provided with insulated doors 26 and 28. The bottom of the below freezing compartment 22 is provided with a false bottom wall 30 resting upon the tops of the fins of a vertically-finned evaporator 34 located between the false bottom wall 30 and a horizontal insulated wall 36. An evaporator compartment 38 is formed between the false bottom wall 30 and the insulated wall 36 within which is located the evaporator 34. The false bottom wall 30 is provided with an entrance 40 to this evaporator compartment 38 between it and the door 26. At the rear, there is connected an upwardly extending duct 42 connecting with the inlet of the fan 44 driven by an electric motor 46. The fan 44 discharges the air upwardly through the duct 48 into the top rear of the compartment 22 from which it flows diagonally downwardly and forwardly to the entrance 40 of the evaporator compartment 38. The evaporator 34 is kept at a low temperature and thereon accumulates any frost which may form. Since this evaporator is isolated from the compartment 22, no frost will form in the compartment.

The lower compartment 24 is provided with a false rear wall 50 behind which is an evaporator compartment 52 located in front of the insulated rear wall 54. This evaporator compartment 52 has a lower entrance 56 forming the inlet to the fan 58 driven by an electric motor 60 located in a recess in the rear wall 54. This fan 58 discharges the air upwardly on both sides of the plate evaporator 62 located in the evaporator compartment 52. This cools the air drawn from the compartment 24 and discharges the cold air through the outlet 64 into the upper portion of the compartment where it falls downwardly to the bottom of the compartment. In the bottom of this compartment are one or two closed vegetable containers 65 for keeping vegetables fresh and moist and cold for good preservation. The refrigerating system includes a compressor motor 66 which operates a conventional compressor, not shown, which in turn is operatively connected to a condenser for flow through a restrictor to the first evaporator 34 and the second evaporator 62 in series. The thermostat 68 is connected in series with the compressor motor 66 and the fan motor 46. It is set to operate on a defrosting cycle and opens the circuit to these motors when the evaporator 62 reaches a temperature of 2° F. and closes the circuit to these motors when the evaporator 62 reaches a temperature of 36° F., thus insuring the defrosting every cycle of the evaporator 62. However, the evaporator 34 remains at a low temperature of about 0° F. during both the running and off cycles. This causes the evaporator 34 to gradually accumulate frost on its surfaces, thereby reducing its effectiveness and also obstructing the flow of air through the evaporator compartment.

To remove this frost, the evaporator periodically is defrosted by the application of heat by the defrost heater 70. According to my invention, this is controlled by a conically-shaped sealed glass receptacle 72 containing twenty-eight grams of distilled water. This receptacle 72 is located in a conically-shaped well 74 in the insulation 36 and has its upper face in contact with a removable plate 76 forming part of the drain pan 77 beneath the evaporator 34. Preferably, the glass receptacle 72 is made of borosilicate glass. On its wide top surface 78, it is provided with a 10 watt, 1580 ohm strip heater 80 formed by an extremely thin film of zinc oxide bonded to the surface of the glass. One of the ends of each of these strips are electrically connected by a silver metal strip 82 formed by spraying the silver metal onto the glass surface. The opposite ends are connected by similar silver strips 84 and 86 similarly formed by spray metal.

The strip 86 continues on down to the base 90 having a base heater 92 formed of four strips joined in series in the form of thin films of zinc oxide bonded directly to the surface of the glass. This bottom or base heater hase a value of 4840 ohms and 2.9 watts. It has one terminal connected to the strip 86 and a second terminal connected by a silver metal spray strip 94. The sealed receptacle 72 is supported and held in place against the bottom of the plate 76 by a four-armed plus-shaped spider 96 which fastens to the plate 76 at the ends of its four arms. This spider supports three spring contact members 98, 121 and 123 which are held in contact with three oval-shaped terminal portions 125, 127 and 129 forming a continuation of the sprayed metal strips 94, 86 and 84 respectively. These contact members 98, 121 and 123 connect to the conductors 131, 133 and 135. The spider 96 also supports a thermostatic switch 137 sealed in glass and held against the base of the receptacle 72. The thermostat 137 is connected by the conductor 139 to the electric heater 141 of a bimetal timing relay 151 which includes the bimetal element 143 which is of the double throw type and normally connects through the contact 145, the conductor 147 and the thermostatic switch 68 with the compressor motor 66 and the fan motor 46. The heater 141 is of a special glass having a composition making it a high resistance electrical heater. The glass receptacle 72 is charged with twenty-eight grams of water to which the reference character 149 is applied.

Figure 1:
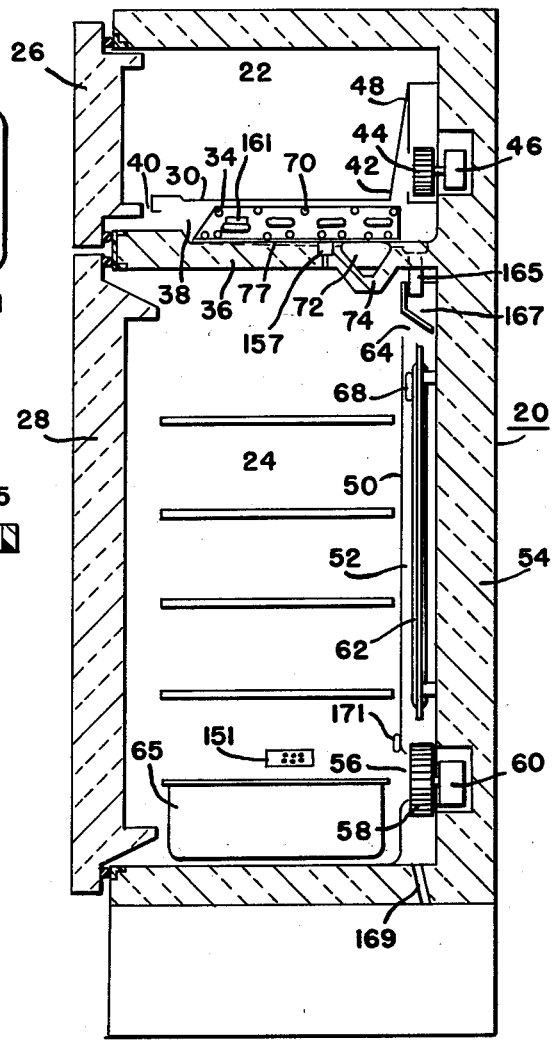
FIGURE 1 is a side vertical sectional view of a household refrigerator embodying one form of my invention.
Figure 11:
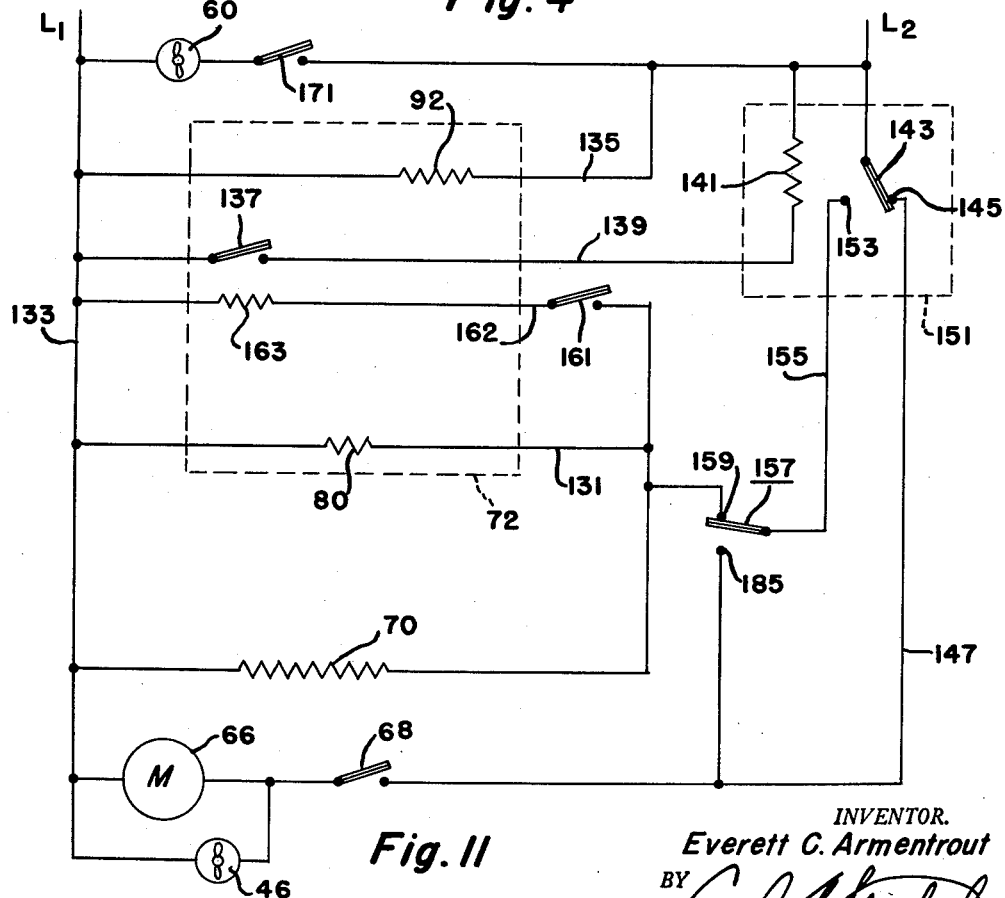
FIGURE 11 is a wiring diagram for the system shown in FIGURES 1–10.
Figure 7:
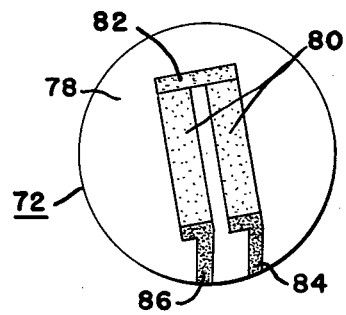
FIGURE 7 is a top view of the closed receptacle constituting the principal control element of the defrosting system.
Figure 8:
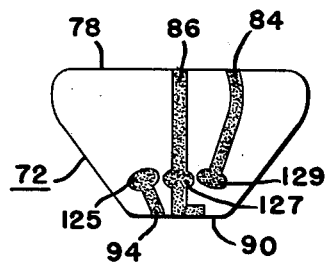
FIGURE 8 is a side view of the closed receptacle.
Figure 10:
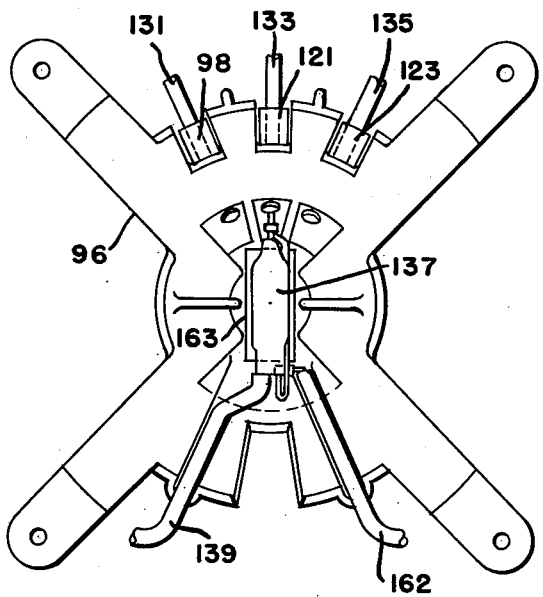
FIGURE 10 is a top view of the spider-type holder for the closed receptacle and the bottom control switch and heater as well as the contact mechanism with the conductors on the closed receptacle.

As shown in the wiring diagram, FIGURE 11, the base heater 92 is continuously connected between the supply conductors $L_1$ and $L_2$. This is sufficient to very slowly vaporize the twenty-eight grams of water in the glass receptacle 72. This takes about twenty-four hours. This water freezes upon the upper face 78 of the closed receptacle 72 which is kept at freezing temperatures by the evaporator 34 which is in direct contact with the plate 76 which rests on top of the receptacle 72. The timing relay 151 is located in a wall of the above freezing compartment 24 adjacent the vegetable containers 65. When all of the water 149 in the closed receptacle 72 has been evaporated from the base portion by the heater 92 and frozen onto the top surface 78, the temperature of its base 90 will rise due to the continued heating and diminished cooling causing the heating of the thermostat 137 until it reaches its closing point of 160°. This closes the circuit through the conductor 139 and the heater 141 to cause the timing relay bimetal switch member 143 to move out of contact with the contact 145 and into contact with the contact 153. This contact 153 is connected through the conductor 155 and a bimetal switch 157, called a safety switch, which is normally in contact with the contact 159 connecting with the conductor 131 and the cap heater 80 as well as the defrost heater 70 in parallel circuit. The contact 159 also connects through a normally closed switch 161 of the thermostatic type which is connected by a conductor 162 in series with a holding heater 163 located directly beneath the thermostat switch 137. The thermostatic switch 161 is calibrated to close at 55° F. and to remain closed as long as its temperature remains below 55° F. This thermostatic switch 161 is sealed in glass and is constructed generally in the same manner as the switch 137. It is fastened by a clip to one of the bends of the refrigerant tubing extending from the evaporator 34 as shown in FIGURE 1. This heater 163 is therefore energized during the defrost period along with the heater 80 and the defrost heater 70.

The defrost heater 70 heats the evaporator 34 and the frost collected thereon so that the frost flows off the evaporator 34 in the form of water onto the drain pan 77. This water flows from the drain pan 77 through the outlet 165, through the insulating wall 36 into a deflector 167 in the above freezing compartment 24 and flows down the back wall of the evaporator compartment 52 to a drain 169 leading to a water disposal device located in the machinery compartment. The heater 163 applies heat to the switch 137 during the defrost cycle to prevent the timing relay 151 from prematurely returning to the refrigeration position. The cap heater 80 heats the upper surface 78 of the receptacle 72 to assure that the ice congealed thereon is melted during the defrost cycle and returns to the base 90 to again form the pool of liquid 149 therein to prepare for the start of the new cycle.

The heater 163 prevents the cooling effect of this return water 149 from opening the switch 137 while defrosting is still required during the defrost period. The defrost heater 70 continues in operation to heat the evaporator 34 and defrost the frost thereon until the switch 161 on the evaporator 34 reaches the temperature of 55° and opens. This deenergizes the heater 163 allowing the switch 137 to be cooled by the liquid in the receptacle 72 causing the switch 137 to cool and open and deenergize the heater 141, thus allowing the bimetal switch 143 to move away from the contact 153 and back into contact 145 to resume the normal refrigeration cycling under the control of the thermostat 68. The timing relay 151 is placed in the above freezing compartment and has a perforated wall 142 permitting air circulation so that it will cool rapidly and rapidly move back to the refrigerating position quickly after the heater 141 is deenergized. The fan 58 by inducing circulation aids in cooling the timing relay 151. The motor 60 of the fan 58 is controlled by a thermostat 171 connected in series with it and located adjacent the entrance 56 to the fan 58.

Figure 2:
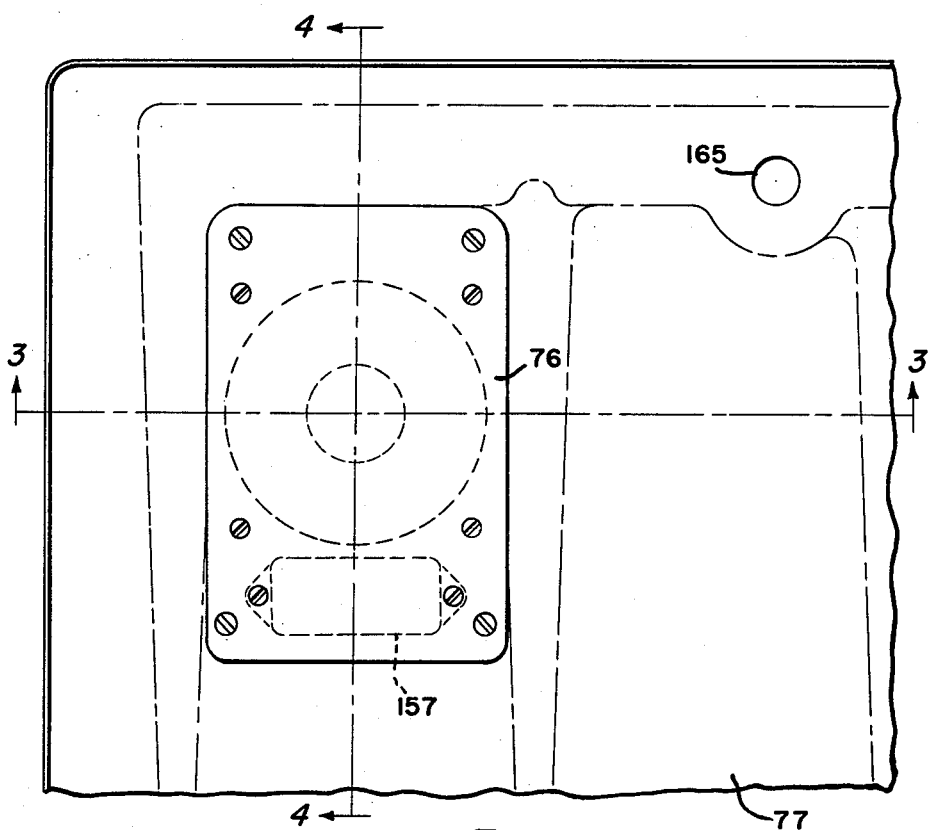
FIGURE 2 is a top view of a portion of the drain pan for the below freezing evaporator shown in FIGURE 1 illustrating the location of the principal control elements of the defrosting apparatus.
Figure 3:
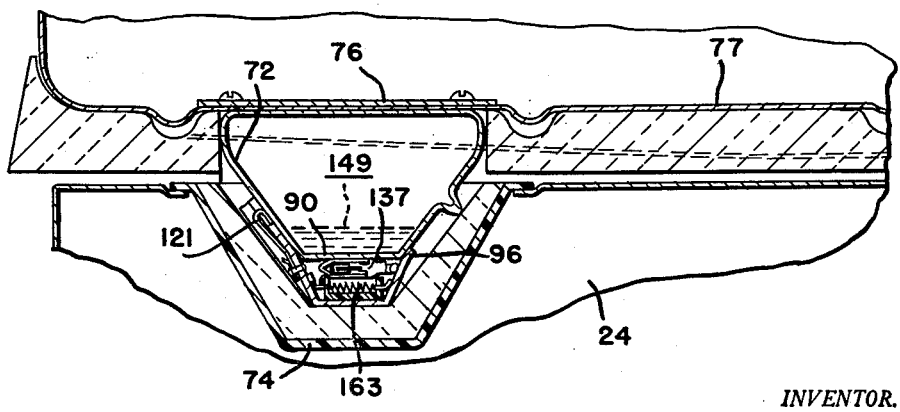
FIGURE 3 is a fragmentary sectional view taken along the line 3—3 of FIGURE 2.
Figure 4:
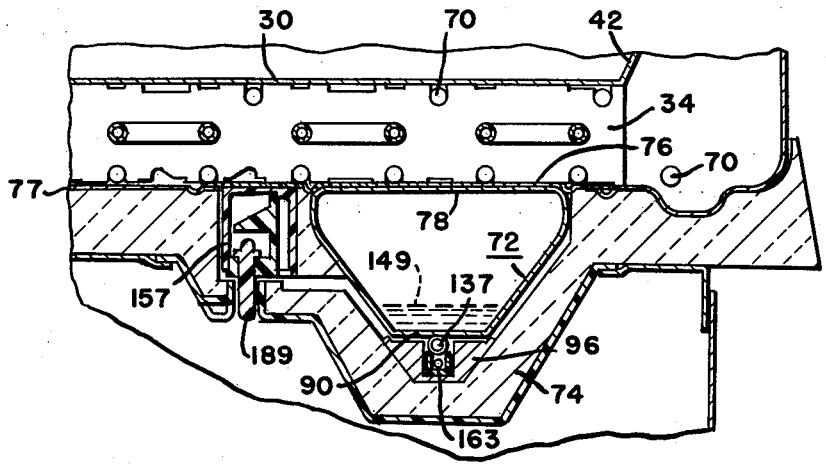
FIGURE 4 is a fragmentary sectional view taken along the line 4—4 of FIGURE 2.
Figure 9:
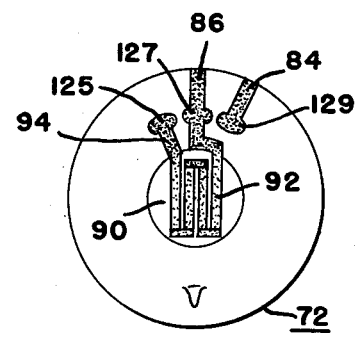
FIGURE 9 is a bottom view of the closed receptacle.

The safety switch 157 includes a housing 173 clamped directly to the bottom of the drain pan 77 as shown in FIGURES 9 and 2. It includes an L-shaped structural member 175 fastened to the base 177. This L-shaped member has fastened to it a hook-shaped actuating bimetal member 179 acting through the toggle blade 181 to operate the double throw contact member 183 having its one end anchored to the L-shaped member 177 as shown. The housing 173 conducts heat and cold between the drain pan 77 and the members 177, 179. When the member 179 reaches a temperature of about 90° F., it will bow upwardly far enough to cause the toggle spring 181 to trip the contact member 183 from its upper position to its lower position in contact with the stationary contact 185. This deenergizes the defrost heater 70 and prevents overheating of the evaporator 34 and its compartment 38 and surrounding parts in the event that the control system fails to function for any cause whatsoever. The control 157 is provided with a shoulder 187 which stops the bimetal arm 179 in its downward movement so that it is incapable of returning the contact member 183 to its normal upper position. This insures that, after a defrost cycle which causes overheating of an evaporator, the defrost system will not again repeat without the owner being aware of it. The safety switch 157 in this safety position insures resumption of refrigeration under the control of the switch 68. If the switch 157 trips to the safety position, to return to the automatic defrosting, it must be reset by the return push button 189 which is slidably mounted in the base 157 and normally is separated from the blade 183. An upward push of the push button 189 moves the blade 183 away from the contact 185 and back into contact with the contact 159 to make possible continued automatic defrosting.

Figure 12:
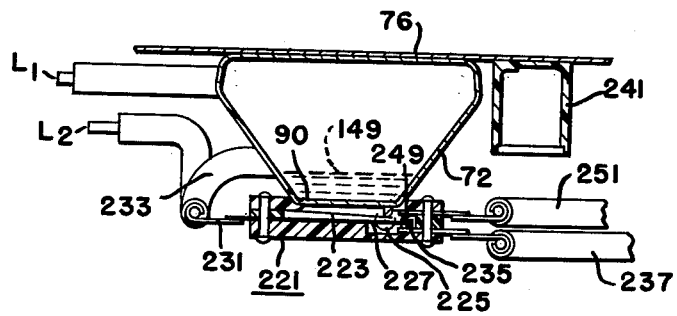
FIGURE 12 is a vertical sectional view through the bottom of a modified principal control element.
Figure 13:
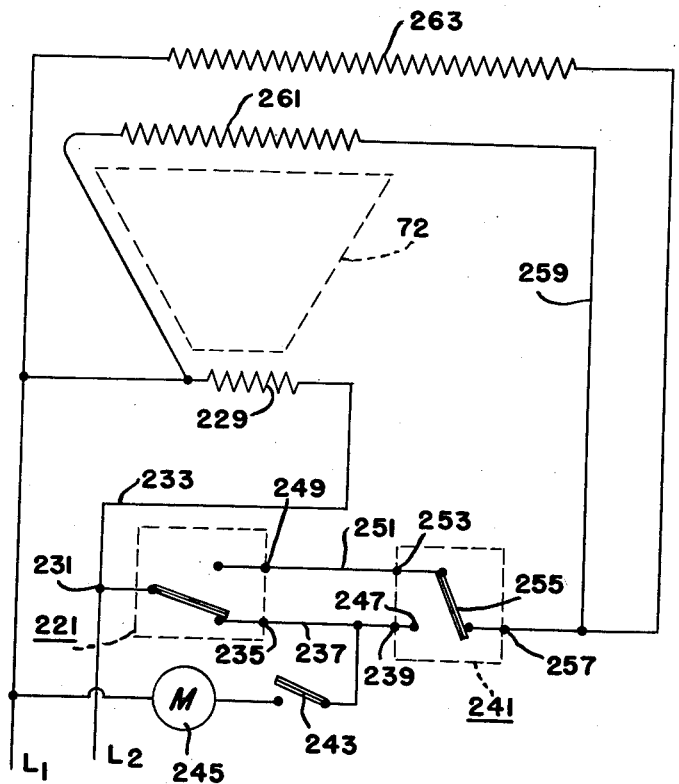
FIGURE 13 is a simplified wiring diagram for the system including the control element shown in FIGURE 11.

In the form shown in FIGURES 12 and 13, a simplification is accomplished by consolidating the thermostatic switch 137, the holding heater 163 and the timing relay 151 into a single double throw bimetal switch 221 mounted directly at the base of the closed receptacle. The closed receptacle 72 remains the same with the top or cap heater 80 on the top 76 and the base heater 92 at the base 90. However, directly mounted to the base 90 is a double throw bimetal switch, generally designated by the reference character 221, having a bimetal actuating tongue 223 connected through a C-shaped toggle spring 225 to a double throw spring blade 227 carrying a double throw contact. The base heater 229 is decreased in resistance and increased in wattage so that, whenever all the water within the receptacle 72 is evaporated from the base thereof and frozen onto the upper surface, the bimetal 223 will be heated sufficiently to cause it to move downwardly and trip the spring blade 227 to the upper position in contact with the contact 249 and to hold it there for the duration of the defrost cycle. This bimetal 223 operates the blade 227 to this upper position when it reaches a temperature of about 125° to initiate the defrost cycle. In this form, the charge of distilled water 149 for the receptacle 72 is increased to thirty grams to compensate for the increased wattage of the base heater 229.

The terminal 231 has one connection to the supply conductor $L_2$ and a conductor 233 connecting with the base heater 229 which in turn is connected to the second supply conductor $L_1$. The terminal 235 is connected by the conductor 237 to the terminal 239 of the safety switch 241 which is identical to the safety switch 157. This terminal 239 is connected through the thermostat switch 243 and the compressor motor 245 to the supply conductor $L_1$. The terminal 239 also connects to one contact 247 of the safety switch. The terminal 249 of the switch 221 is connected by a conductor 251 to the terminal 253 connecting with the double throw switch member 255 of the safety switch 241. The third terminal 257 of the safety switch 241 is connected by the conductor 259 to the upper or top heater 261 of the receptacle 72 and in turn is connected to the supply conductor $L_1$. The defrost heater 263 is connected directly in parallel with the heater 261 between the terminal 257 and the supply conductor $L_1$. When the heater 261 returns a sufficient amount of ice as water to the base of the receptacle 72, the bimetal 223 is cooled sufficiently in spite of the heater 229 to return to its normal refrigeration position shown in FIGURE 12 to terminate the defrost cycle. The safety switch 241 acts like the safety switch 157.

If desired, the below freezing compartment may be located below the above freezing compartment with the evaporator for the below freezing compartment and the receptacle and the safety switch being loctaed in the wall between the below freezing compartment and the machinery compartment.

While the embodiments of the present invention as herein disclosed, constitute preferred forms, it is to be understood that other forms might be adopted.

What is claimed is a follows:

1. A refrigerating system including refrigerant liquefying and evaporating means operatively connected, a closed receptacle having a first portion in heat transfer relationship with said evaporating means and having a second portion, means for heating said second portion, said receptacle containing a liquid movable by the differential in temperature of said first and second portions from said second portion to said first portion, means for defrosting said evaporating means comprising control means operable in response to the movement of said liquid from said second portion to said first portion, and a second heating means in direct heat transfer relation with said first portion and responsive to the operation of said control means for moving said liquid from said first portion back to said second portion.

2. A refrigerating system including refrigerant liquefying and evaporating means operatively connected, a closed receptacle having a first portion in heat transfer relationship with said evaporating means and having a second portion, a first heater integral with the wall of said second portion, said receptacle containing a liquid movable by the differential in temperature of said first and second portions from said second portion to said first portion, a second heater integral with the wall of said first portion, and control means operable in response to the movement of said liquid from said second portion to said first portion for energizing said second heater and for controlling said liquefying means.

3. A refrigerating system including refrigerant liquefying and evaporating means operatively connected, a closed receptacle having a first portion in heat transfer relationship with said evaporating means and having a second portion, means for heating said second portion, said receptacle containing a liquid movable by the differential in temperature of said first and second portions from said second portion to said first portion, a thermostatic switch associated in heat transfer relation with said second portion and operable from one position to another in response to an increase in temperature resulting from the movement of said liquid from said second portion to said first portion, and a relay controlled by said thermostatic switch for changing the operation of said liquefying means to provide a defrosting cycle.

4. A refrigerating system including refrigerant liquefying and evaporating means operatively connected, a closed receptacle having a first portion in heat transfer relationship with said evaporating means and having a second portion, means for heating said second portion, said receptacle containing a liquid movable by the differential in temperature of said first and second portions from said second portion to said first portion, a thermostatic switch associated in heat transfer relation with said second portion and operable from one position to another in response to an increase in temperature resulting from the movement of said liquid from said second portion to said first portion, a second heating means in intimate heat transfer relation with said first portion of said receptacle, and a relay controlled by said thermostatic switch for energizing said second heating means.

5. A refrigerating system including refrigerant liquefying and evaporating means operatively connected, a closed receptacle having a first portion in heat transfer relationship with said evaporating means and having a second portion, means for heating said second portion, said receptacle containing a liquid movable by the differential in temperature of said first and second portions from said second portion to said first portion, a thermostatic switch associated in heat transfer relation with said second portion and operable from one position to another in response to an increase in temperature resulting from the movement of said liquid from said second portion to said first portion, a second heating means in heat transfer relation with said thermostatic switch, and a relay controlled by said thermostatic switch for energizing said second heater.

6. A refrigerating system including a cabinet having insulated walls enclosing an upper below freezing compartment and a lower above freezing compartment, an insulated wall separating said upper and lower compartments, a false bottom wall spaced above said insulated wall providing an evaporator compartment in between, a first evaporator with said evaporator compartment and a second evaporator located in heat transfer relation with said lower compartment, means for circulating air from said below freezing compartment through said evaporator compartment in heat transfer with said first evaporator and return, a closed receptacle having an upper first portion in heat transfer relation with said evaporator compartment and a lower second portion lodged in said insulated wall, said receptacle having the second portion lower than the first portion for gravity flow from said first portion to said second portion and containing a limited quantity of water normally collecting by gravity in said lower second portion capable of freezing at temperatures normally prevailing in said evaporator compartment adjacent said first portion, and means for defrosting said first evaporator comprising control means associated with said receptacle and responsive to the freezing of said water.

7. A refrigerating system including means forming an evaporator compartment and a second compartment, means separating said evaporator compartment from said second compartment, a closed receptacle having an upper first portion of its surface exposed in said evaporator compartment and a lower second portion of its surface isolated from said evaporator compartment, an evaporator in said evaporator compartment for cooling said second compartment and said first portion of said receptacle, said receptacle being arranged for gravity flow from said first portion to said second portion and containing a congealable liquid normally collecting by gravity in said lower second portion, liquefying means operably connected to said evaporator for normally maintaining said evaporator below the congealing temperature of said congealable liquid, and means responsive to the congealing of a predetermined amount of said liquid upon said first portion for controlling said liquefying means.

8. A refrigerating system including means forming an evaporator compartment and a second compartment, means separating said evaporator compartment from said second compartment, a closed receptacle having an upper first portion of its surface exposed in said evaporator compartment and a lower second portion of its surface isolated from said evaporator compartment in said separating means, said receptacle being arranged for gravity flow from said first portion to said second portion containing a liquid normally collecting by gravity in said lower second portion, an evaporator in said evaporator compartment for cooling said second compartment and said first portion of said receptacle, heating means associated with said second portion and the liquid in said receptacle for causing said liquid to migrate from said second portion to said first portion, liquefying means operably connected to said evaporator, and control means for said liquefying means responsive to a predetermined migration of said liquid from said second portion to said first portion of said receptacle.

9. A refrigerating system including refrigerant liquefying and evaporating means operatively connected, a closed receptacle having a first portion in heat transfer relationship with said evaporating means and having a second portion, a first heater integral with the wall of said second portion, said receptacle having the second portion lower than the first portion for gravity flow from said first portion to said second portion and containing a liquid movable by the differential in temperature of said first and second portions from said second portion to said first portion and movable by gravity from the first portion to the second portion, control means for said liquefying means operable in response to the movement of said liquid from said second portion to said first portion, means for normally controlling said liquefying means to maintain said evaporating means below the congealing temperature of the liquid in said receptacle, said control means comprising means for deenergizing said first heater and stopping said liquefying means to allow the return of said liquid in said receptacle to said second portion.

References Cited in the file of this patent

UNITED STATES PATENTS

| | | |
|---|---|---|
| 2,531,136 | Kurtz | Nov. 21, 1950 |
| 2,940,277 | Pas | June 14, 1960 |